United States Patent
Decorme et al.

(10) Patent No.: US 9,751,448 B2
(45) Date of Patent: Sep. 5, 2017

(54) DEVICE FOR SUPPORTING ACCESSORIES AND HAVING ADJUSTMENT MEANS AND RELATED ASSEMBLY

(75) Inventors: Jacques Decorme, Montcy Notre Dame (FR); David Billy, Bressuire (FR); Alexis Crabeil, Cerizay (FR)

(73) Assignees: ADVANCED COMFORT SYSTEMS FRANCE SAS—ACS FRANCE, Bressuire (FR); FAURECIA AUTOMOTIVE INDUSTRIE, Nanterre (FR)

( * ) Notice: Subject to any disclaimer, the term of this patent is extended or adjusted under 35 U.S.C. 154(b) by 207 days.

(21) Appl. No.: 13/813,289

(22) PCT Filed: Jul. 29, 2011

(86) PCT No.: PCT/FR2011/051847
§ 371 (c)(1),
(2), (4) Date: Jan. 30, 2013

(87) PCT Pub. No.: WO2012/013912
PCT Pub. Date: Feb. 2, 2012

(65) Prior Publication Data
US 2013/0126696 A1    May 23, 2013

(30) Foreign Application Priority Data

Jul. 30, 2010    (FR) ...................................... 10 56352

(51) Int. Cl.
*B60P 7/08*    (2006.01)
*B60R 7/02*    (2006.01)
*B60R 22/00*    (2006.01)

(52) U.S. Cl.
CPC    *B60P 7/08* (2013.01); *B60R 7/02* (2013.01); *B60R 22/00* (2013.01); *B60R 2022/005* (2013.01)

(58) Field of Classification Search
CPC ..... B60P 7/0823; B60P 7/0846; B60P 7/0807; B60P 7/08; B60P 7/0815; B60R 9/048;
(Continued)

(56) References Cited

U.S. PATENT DOCUMENTS

| 496,696 | A | * | 5/1893 | Nash | 211/89.01 |
| 584,229 | A | * | 6/1897 | Mayer | 206/478 |

(Continued)

FOREIGN PATENT DOCUMENTS

| CN | 2675469 | 2/2005 |
| CN | 101028805 | 9/2007 |

(Continued)

*Primary Examiner* — Ingrid M Weinhold
(74) *Attorney, Agent, or Firm* — Davidson, Davidson & Kappel, LLC; Jennifer L. O'Connell; William C. Gehris

(57) ABSTRACT

The present invention provides a support device. The support device includes a strap, the active length of which is variable, the strap supporting the accessory against the bearing element. The device includes a rail extending between two ends along the strap, the rail is secured to the wall, and a sliding element which slides along the rail, the sliding element includes a passage into which the strap is to be inserted. The device includes an adjustment device for adjusting the active length of the strap. The strap can be extended, relative to the adjustment device, between a retracted configuration, in which the active length is at a minimum, and an extended configuration, in which the active length is at a maximum. The adjustment device includes an element for returning the strap to the retracted configuration thereof.

16 Claims, 10 Drawing Sheets

(58) Field of Classification Search
CPC .............. B60R 2011/0071; B60R 7/02; B60R 2022/005; B60R 2011/0019; B60R 2011/0036; B60R 7/005; B65D 63/02; B65H 75/4431; B65H 75/4428; B65H 75/48; B65H 75/486
USPC ................ 248/499, 505, 313, 154; 140/100; 211/75, 89.01, 124; 410/97, 100; 242/385.4, 385; 224/534, 324, 568, 543
IPC .................. B60P 7/0823, 7/0846, 7/0807, 7/08, 7/0815; B65D 63/02
See application file for complete search history.

(56) References Cited

U.S. PATENT DOCUMENTS

| | | | | |
|---|---|---|---|---|
| 2,491,652 | A * | 12/1949 | Feerick | 211/71.01 |
| 3,812,976 | A * | 5/1974 | Rempel | 211/70.6 |
| 4,243,350 | A * | 1/1981 | Hall | 410/100 |
| 4,369,009 | A * | 1/1983 | Fulford | 410/35 |
| 4,954,030 | A * | 9/1990 | Szucs et al. | 410/96 |
| 5,613,614 | A * | 3/1997 | Richardson | 211/89.01 |
| 6,149,361 | A * | 11/2000 | Schrader | 410/102 |
| 6,322,279 | B1 * | 11/2001 | Yamamoto et al. | 403/97 |
| 6,669,302 | B2 * | 12/2003 | Warner et al. | 297/483 |
| 6,772,929 | B1 | 8/2004 | Stein | |
| 6,863,200 | B2 * | 3/2005 | Beglau | 224/482 |
| 7,147,416 | B2 * | 12/2006 | Cucknell et al. | 410/97 |
| 7,988,392 | B2 * | 8/2011 | Aebker | 410/89 |
| D661,175 | S * | 6/2012 | Dahl et al. | D8/349 |
| 2003/0145434 | A1 * | 8/2003 | Lin | 24/68 CD |
| 2007/0207000 | A1 | 9/2007 | Bohlke et al. | |
| 2009/0263228 | A1 * | 10/2009 | Tygard | 414/800 |
| 2012/0138649 | A1 * | 6/2012 | Kreis | 224/483 |
| 2012/0211635 | A1 * | 8/2012 | Nemoto | 248/499 |

FOREIGN PATENT DOCUMENTS

| | | |
|---|---|---|
| EP | 1 669 144 A1 | 6/2006 |
| FR | 2 903 051 A3 | 1/2008 |
| FR | 2 914 595 A3 | 10/2008 |
| JP | H07277085 | 10/1995 |
| JP | H0930312 | 2/1997 |

* cited by examiner

DEVICE FOR SUPPORTING ACCESSORIES AND HAVING ADJUSTMENT MEANS AND RELATED ASSEMBLY

The present invention relates to a device for supporting at least one accessory, in particular for a motor vehicle, having a bearing element and a strap with a variable length, the strap being designed to keep the accessory against the bearing element.

BACKGROUND

Such a device is generally designed to the equip an inside element of a motor vehicle, such as panel delimiting a vehicle trunk, a door panel, the lateral sides of the front console or a rear part of a front seat of the motor vehicle.

Already known in the state of the art is a device for supporting at least one accessory, including a bearing element secured to an inner wall of the vehicle and a strap with a variable length designed to keep the accessory against the bearing element. The ends of the strap are fastened on the bearing element.

The length of the strap being variable, it is possible to adapt that length to the dimensions of a supported accessory.

However, such a support device is not suitable for jointly holding several accessories of different sizes. In fact, the length of the strap adapts to the accessory whereof the dimensions are largest, with the result that that strap cannot jointly grip another accessory with smaller dimensions.

Another state of the art uses a non-extensible net delimiting a space, but that device is not suitable for all accessory shapes.

SUMMARY OF INVENTION

The present invention in particular aims to resolve these drawbacks by providing a device for supporting at least one accessory, capable of securely supporting at least two accessories, even if their dimensions are different.

In particular, an object of the invention is to provide effective support for accessories upon impact or abrupt braking to keep them in position.

To that end, the present invention provides a support device having a bearing element and a strap with a variable length, the strap being designed to keep the accessory against the bearing element, characterized in that it includes:
  a rail extending between two ends along the strap, the rail being designed to be secured to the wall;
  at least one sliding element which is to slide along the rail, the sliding element comprising a passage into which the strap is to be inserted; and means for adjusting the active length of the strap, the strap being able to be extended, relative to the adjustment means, between a completely refracted configuration, in which the active length is at a minimum, and a completely extended configuration, in which the active length is at a maximum, the adjustment means including an element for returning the strap to the retracted configuration thereof.

The sliding element may delimit two independent compartments with the strap and the bearing wall. The size of the strap can then vary independently in those two compartments, with the result that those compartments can each receive an accessory of different sizes.

Furthermore, the element may slide so as to be able to adapt its position on the rail as a function of the dimensions of each accessory supported by the device.

The support device according to the invention may include one or more of the following features, considered alone or in combination:
  the adjustment means comprise a winder, the strap winding around the winder when it goes from the extended configuration to the retracted configuration;
  the adjustment means includes means for immobilizing the strap to keep the strap in a given active length configuration between the retracted configuration and the extended configuration;
  the immobilizing means are active for each configuration of the strap between the retracted configuration and the extended configuration, the adjustment means including an unblocking member for the immobilizing means that can be actuated to modify the active length of the strap;
  the device includes additional means for modifying the active length of the strap, which can be actuated independently of the unblocking member when the immobilizing means are activated;
  the adjustment means comprise a housing partially receiving the strap, the housing bearing the return element, the immobilizing means, the unblocking means, and the additional means for modifying the active length of the strap;
  the additional means for modifying the active length of the strap can drive the winder when the immobilizing means are activated;
  the strap is substantially non-extensible;
  the strap is slidably mounted in the insertion passage;
  a first end of the strap is fastened on the adjusting means, a second end of the strap being designed to be fixed relative to the inner wall, the sliding element being arranged between the ends of the strap;
  when the second end of the strap is fixed relative to the inner wall, the or each sliding element is permanently maintained in the rail;
  the device includes a tip for fastening the end of the strap on the rail, the tip advantageously being designed to cooperate with a complementary shape formed the rail, in particular at one end of the rail;
  the sliding element includes gripping means designed to be handled by a user to control the sliding of the sliding element in the rail; and
  the sliding element includes guide means that separate the strap from the rail to allow a user to grasp the strap when the sliding element is received at the rail, the strap being pressed against the rail in the idle position thereof.

The terms "fastening" or "fixed" "relative to the inner wall" refer to fastening on or in the inner wall, directly on that wall, or fastening on the rail, which in turn is fixed or integrated on or in the inner wall.

The present invention also provides an inside motor vehicle element including an inner wall in particular chosen from among lateral trunk trim, a floor, threshold trim, a door panel, the lateral walls of the front console, or a seat element, characterized in that it includes the support device recited above, the rail being secured to the inner wall.

BRIEF DESCRIPTION OF THE DRAWINGS

The present invention will be better understood upon reading the following description, which is provided solely as an example, and done in reference to the appended figures, in which.

DETAILED DESCRIPTION

Figure 1:
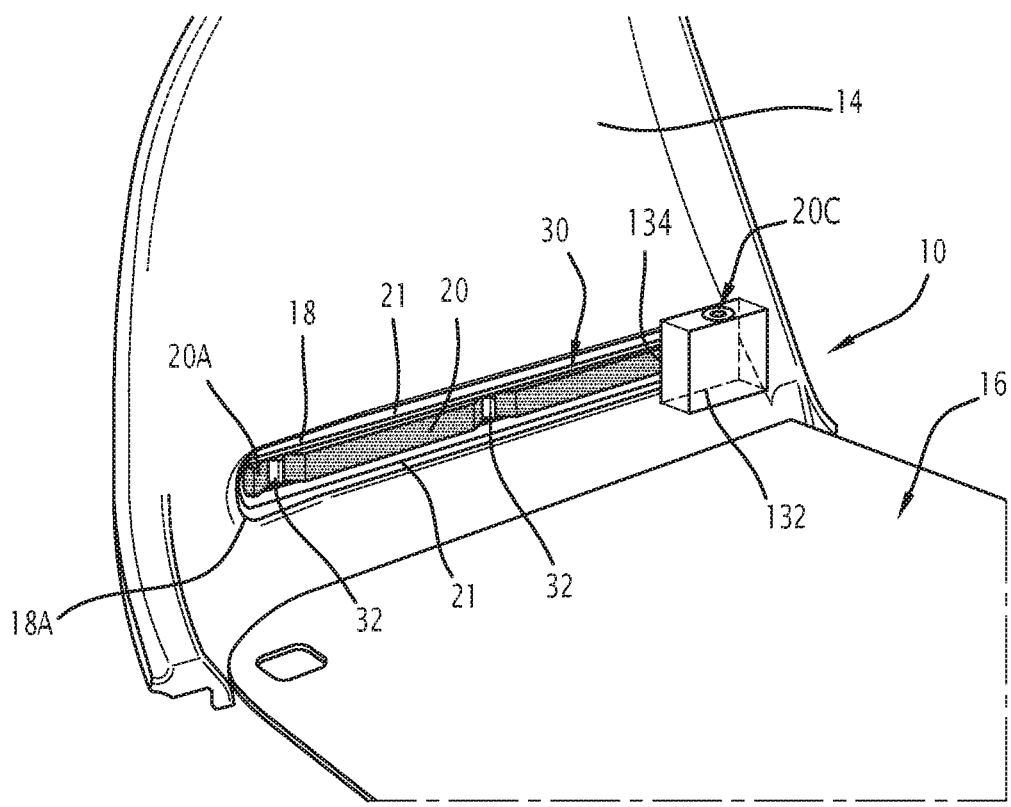
FIG. 1 is a perspective view of the device for supporting one or more accessories according to a preferred embodiment of the present invention, in an idle position in which no accessory is inserted into the device.

The figures show a support device 10 designed to support at least one accessory 12, in particular in a motor vehicle.

The support device 10 is designed to equip an inner wall 14 of the motor vehicle, in this example made up of lateral trim delimiting a trunk 16 of the motor vehicle.

Alternatively, the support device 10 equips a floor, a door panel, threshold trim, the lateral walls of a front console, a seat element, or any other inside element of the motor vehicle.

The support device 10 includes a rail 18 forming a guideway, attached in the lateral tunnel 14. The rail 18 defines a longitudinal slider, extending between two rail ends 18A, 18B, and emerges toward the inside of the trunk 16. Preferably, the rail 18 is made from plastic, sheet metal or aluminum.

The rail 18 and the slider that it delimits can have a horizontal position parallel to the floor 16 (as shown in FIG. 1), or may be inclined (not shown), with an incline angle comprised between 0° and 45°, preferably comprised between 5° and 30°. In the inclined configuration, the rail 18 may adapt to variable accessory heights.

The support device 10 also includes a strap 20 with a variable active length, extending longitudinally between two strap ends 20A, 20B.

According to the invention, it also includes means 20C for adjusting the active length of the strap, which will be described in detail below.

Preferably, the rail 18 has at least one bearing rim 21, against which the strap 20 is designed to keep the accessories 12. The bearing rim(s) 21 is (are) substantially flush with an inner surface defined by the wall 14, such that the support device 10 takes up almost no space in the trunk.

Figure 4:
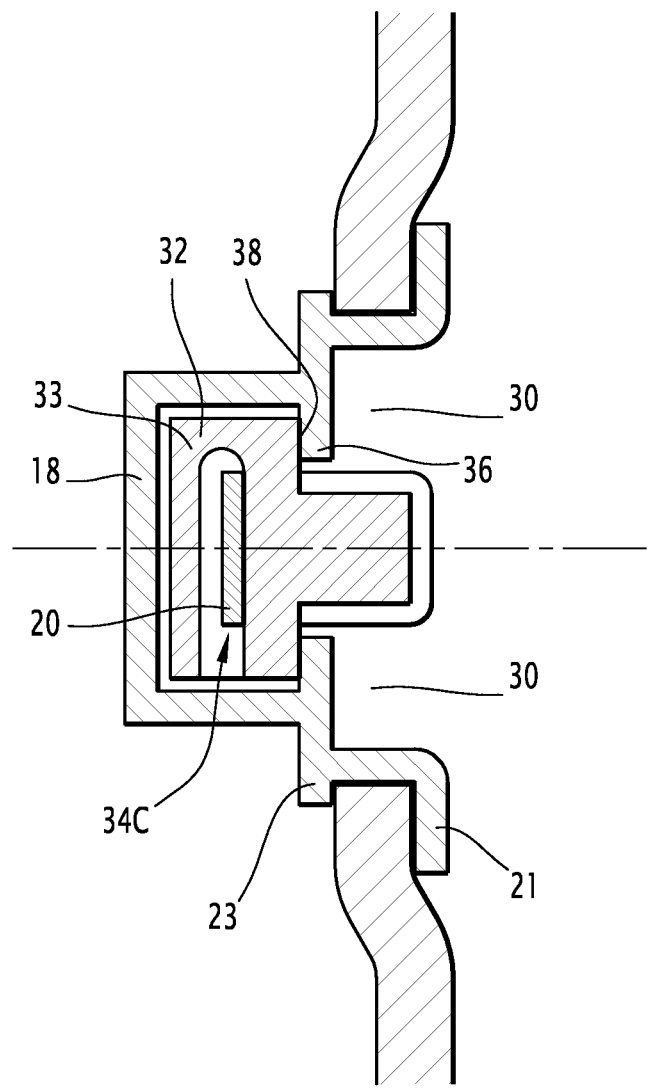
FIGS. 4 and 5 are transverse and longitudinal cross-sectional views, respectively, of the sliding element of the support device of FIG. 3.

In order to fasten the rail 18 on the wall 14, the wall 14 includes an opening with a shape complementary to the rail 18, in which said rail 18 is inserted. In one particular embodiment, the rail 18 includes lips 23, extending across from the bearing rims 21, such that the contour of the opening of the wall 14 is inserted between the lips 23 and the bearing rims 21, as shown in FIG. 4.

One end 18A of the rail 18 is provided with means 22A for fastening a corresponding end 20A of the strap 20. For example, the fastening means, or fastener 22A respectively includes a tip 24A borne by the strap 20.

In one embodiment, the tip 24A includes at least one opening through which a loop formed at the corresponding end 20A of the strap 20 passes.

Figure 7:
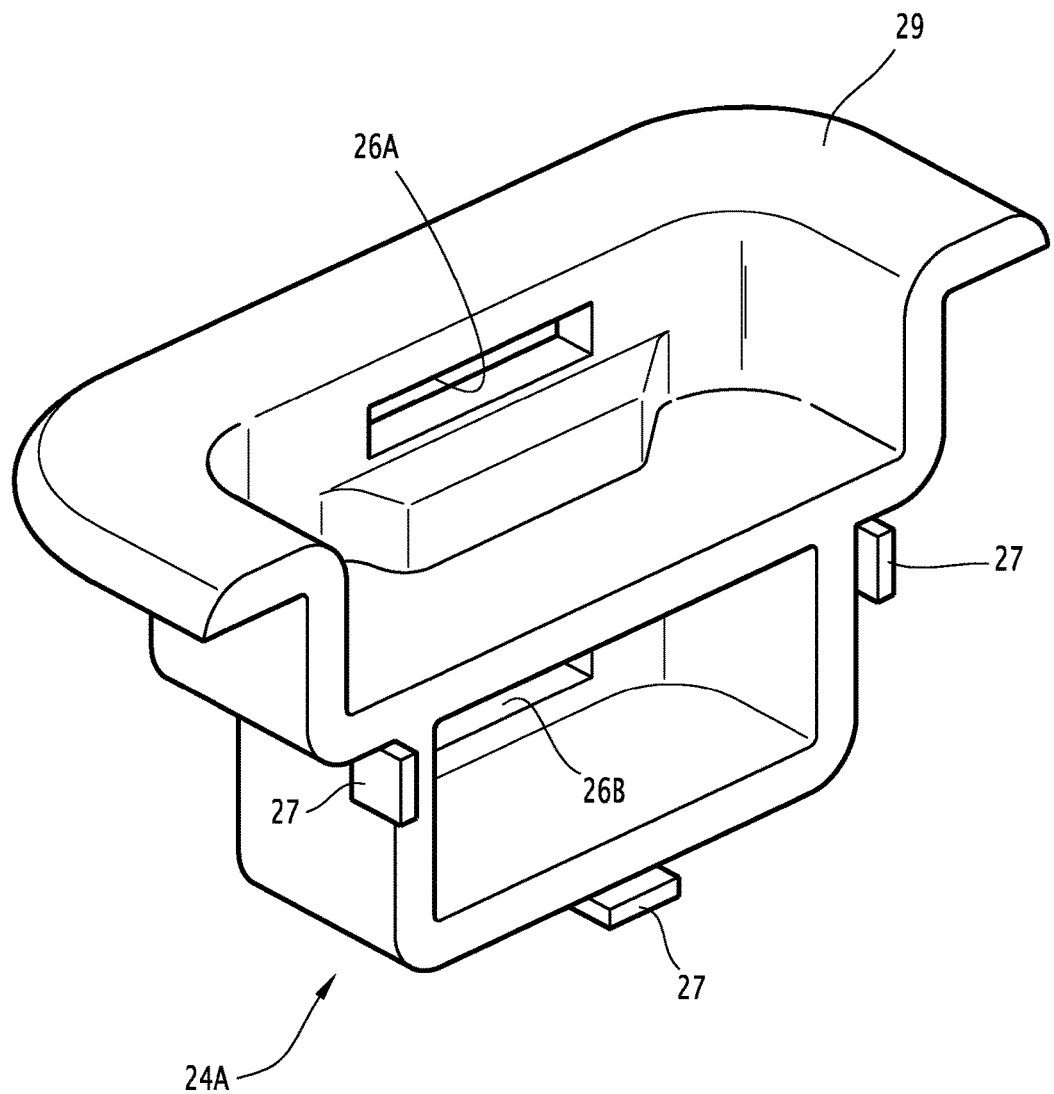
FIG. 7 is a perspective view of an end tip of the support device of FIG. 3.

In another embodiment shown in FIG. 7, the tip 24A includes two openings 26A and 26B through which a loop formed at the corresponding end 20A of the strap 20 passes.

The tip 24A includes one or more snapping tabs 27 designed to cooperate with complementary snapping shapes formed at the corresponding end 18A of the rail 18.

The tip 24A may be profiled to have a flange 29, designed to extend the bearing rings 21 of the rail 18 when said tip 24A is retained on the rail 18.

In one alternative, the tip 24A does not include snapping tabs 27, but rather an embedding flange in which the rail 18 is inserted.

In one particular embodiment, the tip has a simple shape, for example a flat plate.

Preferably, the tip 24A is made from plastic, sheet metal or aluminum.

Advantageously, the strap 20 is formed from a substantially non-extensible material.

"Non-extensible material" means that the extension of the strap without irreversible deformation is less than 5%.

The strap 20 thus has a substantially constant length between its ends 20A, 20B.

As shown in FIG. 1, the strap 20 is pressed against the rail 18, in the slider, in its idle position. Preferably, the rail 18 has a handling cavity 30 formed by a space between the bearing rim 21 and the strap 20, and emerging below the strap 20 in the slider so as to allow a user to grasp that strap 20 when it is in its idle position. Alternatively, the cavity 30 emerges above the strap 20. In another alternative, the cavity 30 emerges above and below the strap 20.

Figure 3:
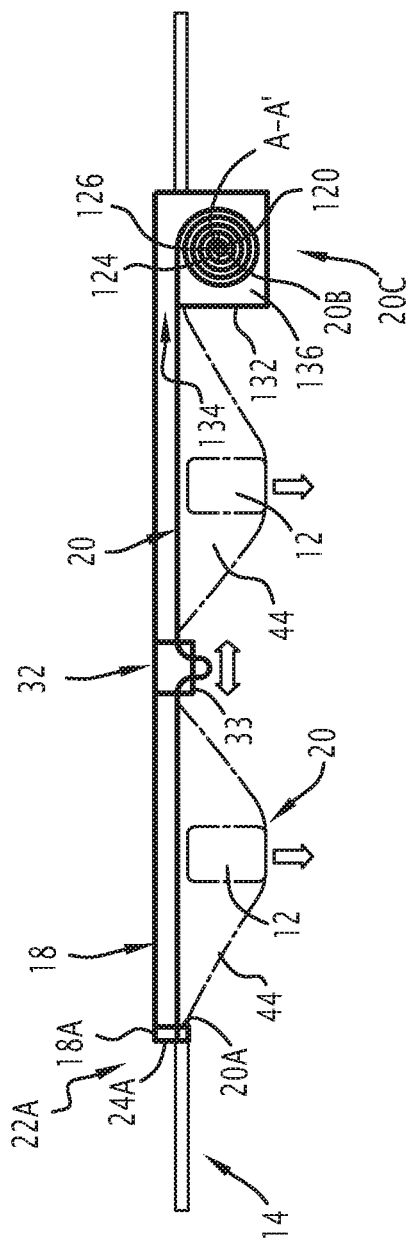
FIG. 3 is a diagrammatic cross-sectional view in a horizontal plane of the device of FIG. 1.

In reference to FIG. 3, the adjusting means 20C include a winder 120 rotatably mounted around an axis A-A' relative to the wall, to cause the strap 20 to go from a retracted configuration to an extended configuration, and an elastic return member 122 for returning the winder 120 toward a retracted configuration of the strap 20. The adjusting means 20C also comprise a fixing device, for example, an immobilizing member 124 that can be released from the strap 20 in each configuration between its retracted configuration and its extended configuration and a button 126 for unblocking the immobilizing member 124.

The adjusting means 20C advantageously include an additional member 130 for adjusting the active length of the strap 20, which can be maneuvered independently of the unblocking member 126 to adjust the active length of the strap 20 when the immobilizing member 124 is activated.

Figure 9:
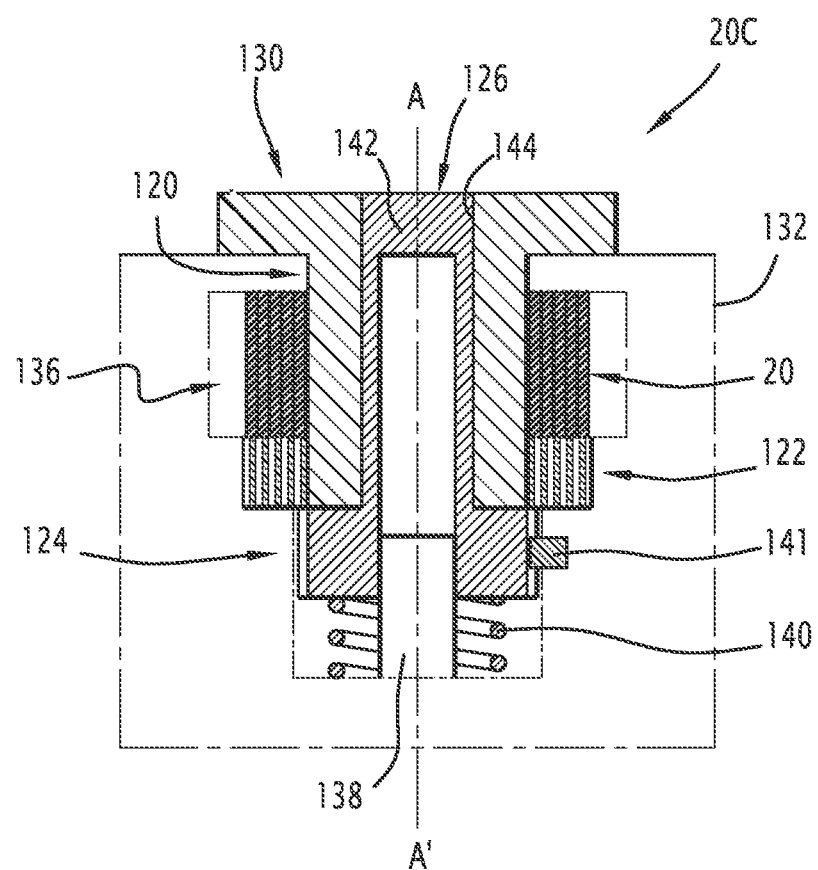
FIG. 9 is a diagrammatic cross-sectional view of a preferred embodiment of the means for adjusting the active length of the strap of the device of FIG. 1.

In one particular embodiment of the invention shown in FIG. 9, for example, the adjusting means 20C are housed in a housing 132 defined or mounted in or on the inner wall 14 of the motor vehicle or clipped or fastened on the inner wall 14 or the rail 18. The housing 132 can thus be reversibly or irreversibly mounted on the wall 14 or the rail 18.

The housing 132 emerges through a passage opening 134 for the strap and delimits an inner volume 136 for receiving the strap 20, the return member 122 and the immobilizing member 124.

The opening 134 emerges near the end 18B of the rail 18, for example across from the guideway defined by the rail 18.

The winder 120 is formed by a cylindrical sleeve with axis A-A' rotatably mounted in the housing 132 around the axis A-A'.

One end 20B of the strap 20 is mounted fixed around the winder 120.

The strap 20 is wound around the winder 120. In this way, rotating the winder 120 in a first direction around the axis A-A' unwinds an increasing length of the strap 20 toward its extended configuration, while rotating the winder 120 in a second direction opposite the first direction around the axis A-A' winds an increasing length of the strap 20 toward its retracted configuration around the winder 120. In this way, the strap 20 has a variable active length defined as the length of the strap that is not wound around the winder 120 and that protrudes away from the adjusting means 20C, outside the housing 132 through the opening 134.

In the completely extended configuration, the active length of the strap 20 is at a maximum and the length of strap 20 wound around the winder 120 is minimal.

On the other hand, in the completely retracted configuration, the active length of the strap 20 is minimal, and is generally substantially equal to the length defined between one end 18A of the rail 18 and the opening 134, considered along the rail 18. The length of strap 20 wound around the winder 120 is then at a maximum.

The return member 122 can rotate the winder 120 in the second direction to return the strap 20 to its wound configuration. It is for example made up of a strip or spiral spring inserted between a stop secured to the housing 132 and the winder 120.

The immobilizing member 124 can keep the winder 120 immobile relative to the housing 132 in an angular position defined around the axis A-A'.

In the embodiment shown in FIG. 9, the immobilizing member 124 is formed by a wheel. The immobilizing member 124 can move between an engaged position, in which it is engaged on the winder 120 to prevent it from turning around the axis A-A', and a disengaged position, in which the winder 120 rotates freely around the axis A-A'.

Advantageously, the immobilizing member 124 is translatable along the axis A-A' between its engaged and disengaged positions. It is guided by an axle 138 and is continuously elastically stressed toward its engaged position by a spring 140, the engaged position thereby constituting an idle position.

In the engaged position, the immobilizing member 124 cooperates with the winder 120 to prevent the winder 120 from rotating around the axis A-A'.

It also cooperates with a retaining stop 141 secured to the housing 132 and engaged at the periphery thereof. The retaining stop 141 ensures angular locking of the immobilizing member.

In another embodiment, the immobilizing member 124 and the retaining stop 141 are in a single and same piece.

In the disengaged position, the member 124 is moved away from the winder 120 against the spring 140.

The immobilizing member 124 is completely received in the housing 132.

The unblocking member 126 is formed by a button 142 accessible from outside the housing 132 by a user, the button 142 being connected to the immobilizing member 124 to allow it to be maneuvered between the engaged position and the disengaged position.

In the example shown in FIG. 9, the button 142 is formed by a cylindrical member slidingly mounted in a cavity 144 delimited in the winder 120 and secured at the free end thereof to the immobilizing member.

The button 142 can thus be moved along the axis A-A' against the spring 140 of the immobilizing member 124 between its engaged position and its disengaged position.

In this example, the unblocking member 126 is formed in a single piece with the immobilizing member 124, which simplifies the structure of the adjusting means 20C.

In the alternative where the adjusting means 20C include an adjuster, for example additional adjusting member 130, that member 130 is for example formed by a hand wheel that can be maneuvered from outside the housing 132. The hand wheel is secured to the winder 120. In the example shown in FIG. 9, the hand wheel protrudes outside the housing 132 at the free end of the winder 120.

The immobilizing member 124 then preferably has a peripheral toothing cooperating with the retaining stop 141.

In that case, rotating the hand wheel makes it possible to rotate the winder 120. In that position, the immobilizing member 124 remains secured in rotation around the axis A-A' with the winder 120, and the stop 141 successively engages with successive peripheral teeth situated at the periphery of the immobilizing member 124.

According to the invention, the maintaining device 10 includes at least one sliding element 32, for example two sliding elements 32, as shown in the figures. Alternatively, the number of sliding elements 32 is greater than two. Each sliding element 32, shown in more detail in FIGS. 4 to 6, delimits a passage 34 for inserting the strap 20.

The sliding element 32 includes a base body 33 with a shape that matches the slider, and a retaining tab 35 for the strap 20.

Figure 5:
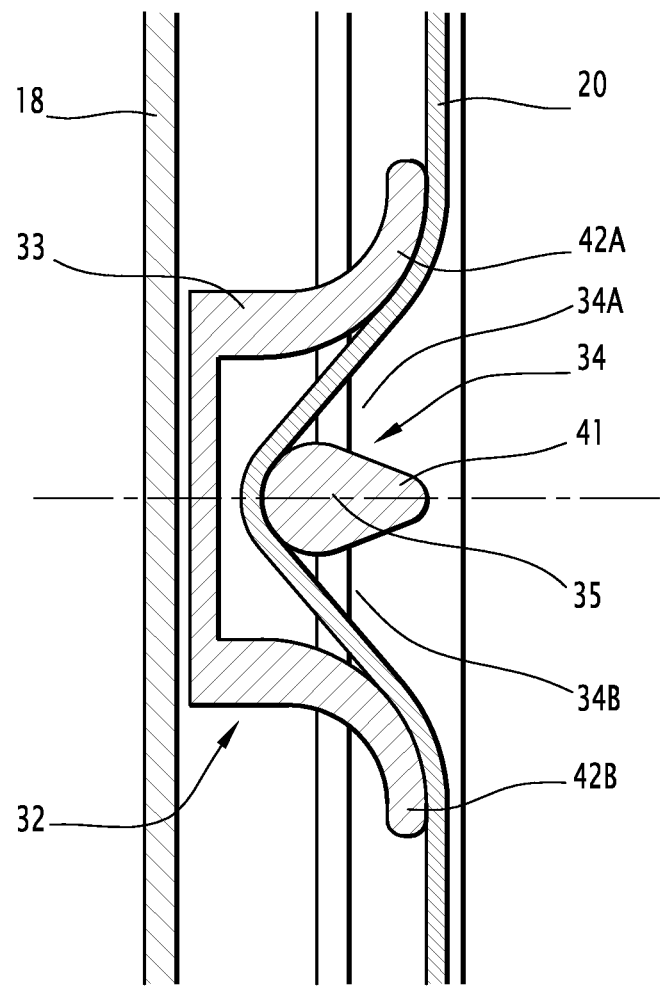

The passage 34 is for example delimited longitudinally between the retaining tab 35 and the base body 33, the strap 20 going around that tab 35 so as to be kept in the sliding element 32, as shown in FIGS. 4 and 5.

The passage 34 emerges through two openings, a front opening 34A and a rear opening 34B for circulation of the strap 20, and emerges downward by an opening 34C for inserting the strap 20 in that passage 34, the insertion opening 34C connecting the circulation openings 34A, 34B.

The circulation openings 34A, 34B thus have a downwardly open contour.

Figure 6:
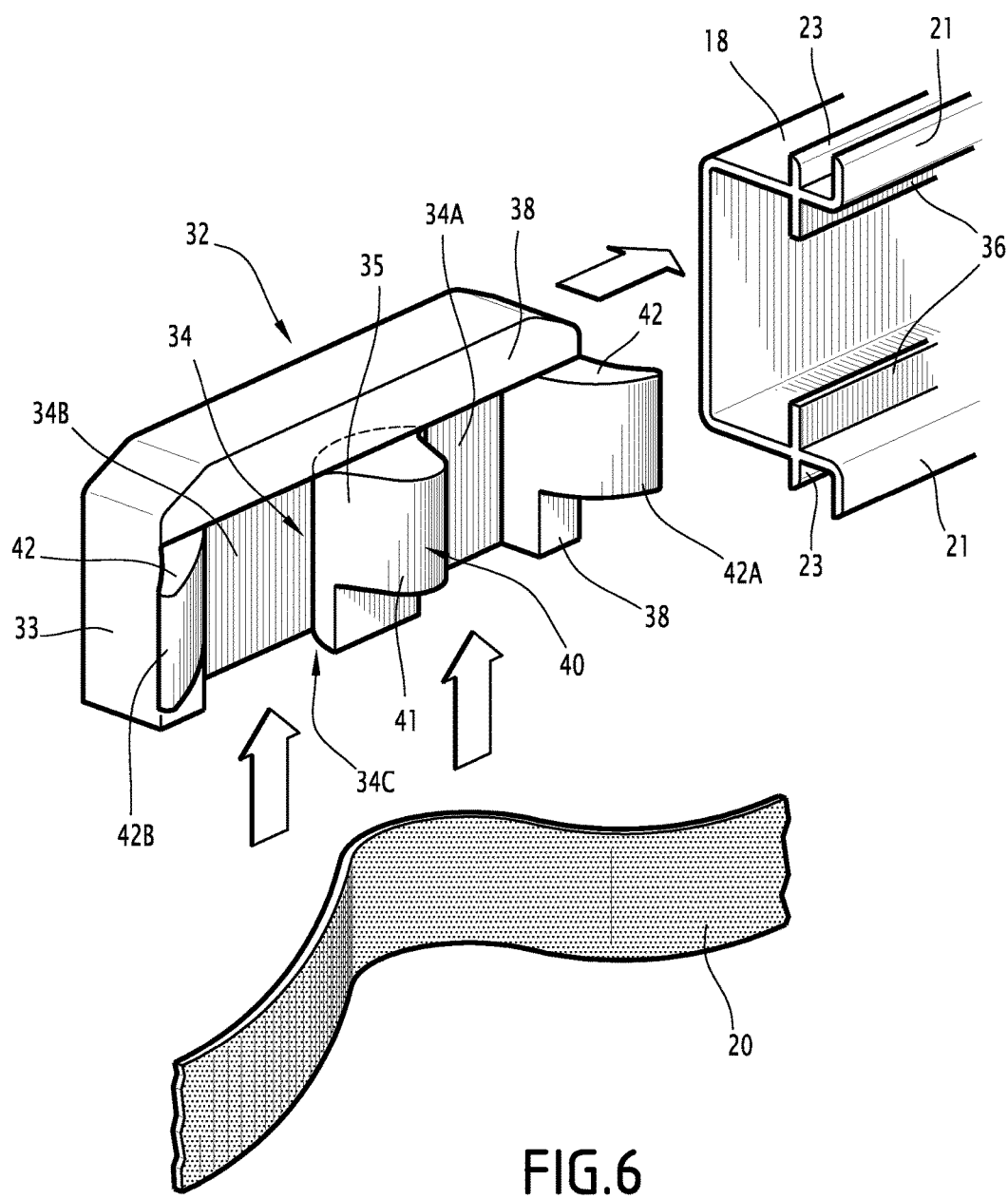
FIG. 6 is an exploded perspective view of the sliding element of FIGS. 4 and 5.

As shown in FIG. 6, the strap 20 is inserted into the passage 34 through the insertion opening 34C on the side of the free end of the tab 35. Then, the sliding element 32 is slid into the rail 18, such that the strap 20 is retained in the passage 34, while being able to slide longitudinally relative to the sliding element 32.

For example, the slider of the rail 18 has a U-shaped section, such that the body 33 of the sliding element 32 cooperates with the U-shaped walls of the slider, so as to be able to slide along those U-shaped walls.

It will be noted that, when the sliding element 32 is inserted into the slider defined by the rail 18, the lower wall of that slider closes off the insertion opening 34C for inserting the strap 20 into the passage 34.

The rail 18 also includes inner rims 36 designed to cooperate with surfaces 38 of the body 33 of the sliding element 32 so as to keep that sliding element 32 in the slider defined by the rail 18.

Preferably, the sliding element 32 is made with a base of a material with a low friction coefficient, such as a polyamide plastic material, so as to be able to slide in the rail 18 without noticeable resistance.

Advantageously, the sliding element 32 is made with a base of a material whereof the dry dynamic friction coefficient is below 0.4, advantageously comprised between 0.08 and 0.2. The friction coefficient is measured using the TABER test.

In this way, the sliding element 32 is mounted freely translating along a longitudinal axis.

Alternatively, the sliding element 32 includes at least one rolling means (not shown) designed to cooperate with the rail so as to favor sliding of the element 32. For example, such rolling means include castors or beads.

Advantageously, the sliding element 32 comprises at least one gripping device, for example, gripping means 40, designed to be manipulated by a user to control the sliding of the element 32 in the rail 18. Thus, even if the sliding element 32 was faced with resistance to its sliding in the rail 18, the user could slide the element 32 using said gripping means 40.

For example, the gripping means 40 including a gripping boss 41 supported by the tab 35, and protruding toward the outside of the slider of the rail 18, and therefore toward the inside of the trunk 16.

In one particular embodiment, the sliding element 32 includes at least one longitudinal guide means 42 for the strap 20. These guide means 42 in particular make it possible to impose a direction on the strap 20 at the exit from the passage 34, so as to move the strap 20 far enough away from the rail 18 to allow the user to catch the strap 20 more easily when it is in the idle position.

The guide means 42 comprise at least one front stop 42A and rear stop 42B protruding relative to the base body 33, at the ends of that body 33 in the longitudinal direction. Each stop 42A, 42B has a sliding surface for the strap 20, which diverges toward the inside of the trunk 16 and away from the base body 33. Thus, when the strap 20 is inserted in the passage 34, it is kept bearing between the sliding surface of the front stop 42A, the retaining tab 35, and the sliding surface of the rear stop 42B.

When the sliding element 32 does not include guide means 42, the user can grasp the strap 20 when it is in the idle position of using the handling cavities 30 located in the rail 18.

The support device according to the invention makes it possible to support different accessories or objects 12 with varying dimensions. In fact, the strap 20 and the rail 18 define, between one end 18A, 18B of the rail 18 and one of the sliding elements 32, or between two consecutive sliding elements 32, distinct compartments 44 in which the strap 20 can be extended separately.

Figure 2:
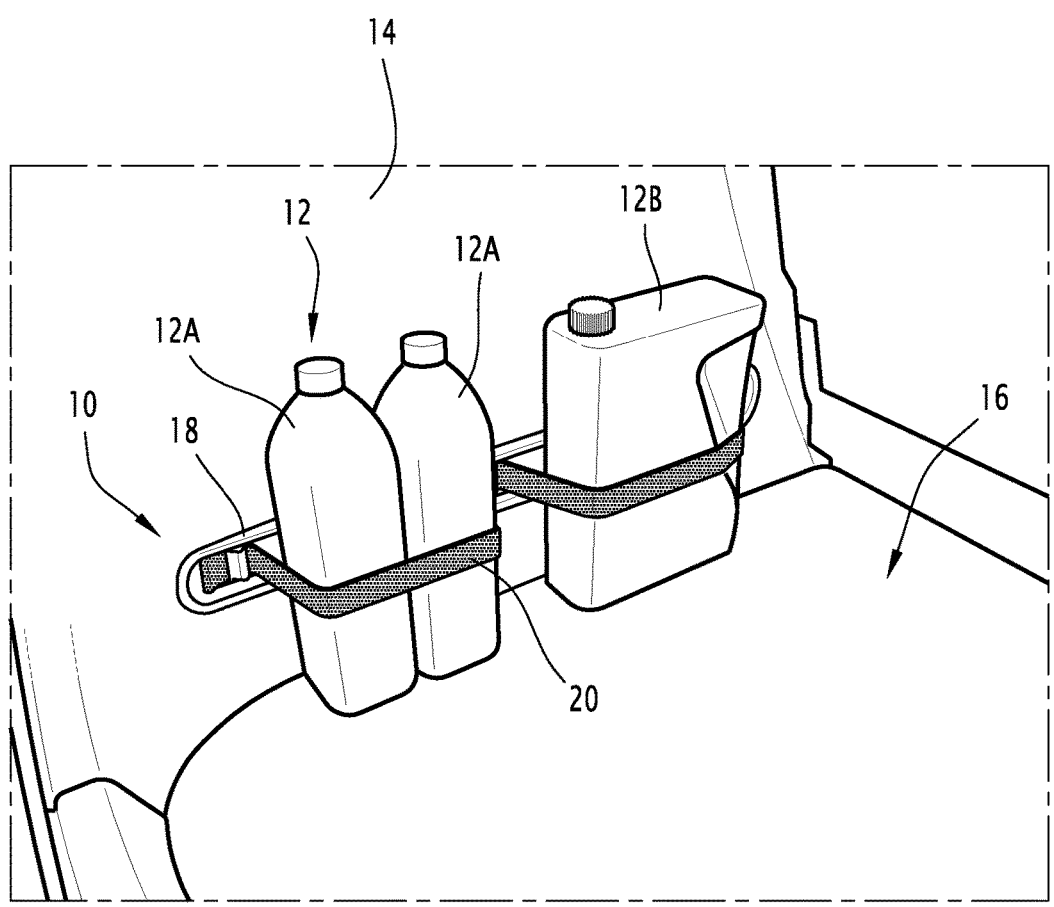
FIG. 2 is a diagrammatic perspective view of the device of FIG. 1, in which accessories to be supported have been inserted.

In this way, the support device according to the invention makes it possible to support at least two accessories or objects 12 with different dimensions, for example two bottles 12A and a can 12B as shown in FIG. 2, the displacement volumes of which are different.

The number of accessories with different dimensions that can be supported by the support device 10 depends in particular on the number of compartments 44 formed between the strap 20 and the rail 18, and therefore depends on the number of sliding elements 32. According to the example shown in FIG. 2, in which the support device 10 includes two sliding elements 32, up to three separate compartments 44 can be defined.

Each compartment 44 automatically adapts to the dimensions of the accessory to be supported. In this way, a same compartment 44 can support both small objects, with a small bulk, and large objects, with a large bulk.

As shown in FIG. 2, several accessories 12A can be supported in the same compartment 44. In that case, it is advantageous for the accessories to have a similar displacement volume or a similar thickness.

A method for mounting a support device 10 as described above will be presented below.

During a first step, the adjustment means 20C are assembled and the end 20B of the strap 20 is fastened on the winder 120.

During a second step, the adjusting means 20C provided with the strap 20 are fastened relative to the wall 14 while being mounted on the rail 18, in particular at one end of the rail 18, or directly on or in the wall 14.

The strap 20 is then extended outside the housing 132 of the adjusting means 20C to have an active length longer than that of the rail 18. The sliding elements 32 are engaged on the strap 20. To that end, the strap 20 is inserted in the passage 34 of each sliding element 32, through the insertion opening so as to go around the tab 35.

During a third step, the sliding elements 32 are slid in the rail 18, by inserting them through the free end of the rail 18. For each sliding element 32 inserted in the rail 18, the lower wall of the rail 18 then downwardly closes off the opening for inserting the strap 20 in the passage 34, such that the strap 20 is then retained in the passage 34.

During the fourth step, the tip 24A is assembled to the free end of the strap 20, then is fastened to the corresponding and 18A of the rail 18.

The unblocking member 126 is then maneuvered to release the winder 120 and allow the strap 20 to be tensed across from the rail 18, under the effect of the return force created by the return member 122.

The device 10 remains integral owing to the minimum tension imposed on the strap 20 in the idle position without supporting any accessories.

Lastly, during the fifth step, the support device 10 is mounted on the wall 14, in the complementary opening of the wall 14, by cooperation of the bearing rims 21 and the lips 23 with a contour of that complementary opening.

As previously indicated, when the support device 10 is mounted on the wall 14, the sliding elements 32 cannot be extracted or removed from the rail 18.

Figure 8:
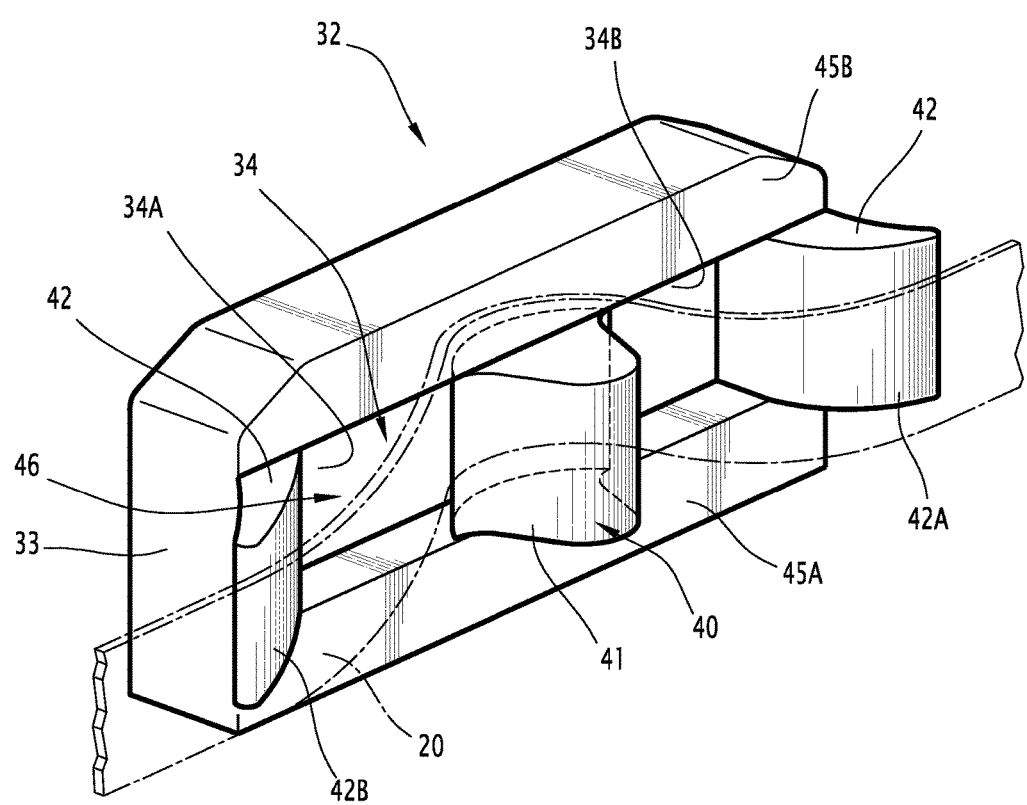
FIG. 8 is a view similar to FIG. 6 for an alternative sliding element.

According to one alternative, shown in FIG. 8, the sliding element 32 has a passage 34, two openings 34A and 34B for circulation of the strap 20, two lateral surfaces 45A and 45A and an open bottom 46.

Each opening 34A, 34B has a closed contour. The passage 34 is delimited between the openings 34A, 34B, outside the tab 35.

As shown in FIG. 8, the strap 20 is inserted into the passage 34 through the circulation opening 34A, goes to the outside of the retaining tab 35 on the side of the wall 14, toward the outside of the vehicle, and emerges through the circulation opening 34B.

The inner rims 36 of the rail 18 cooperate with the lateral surfaces 45A and 45B of the body 33 of the sliding element 32 so as to keep that sliding element 32 in the slider defined by the rail 18.

Below we will describe a method for using the support device 10.

Initially, the strap 20 is idle. The strap 20 extends along the rail 18. It is in its retracted configuration, with a minimal active length.

First, the user grips the strap 20, in particular using the cavity 30 providing easy gripping access to said strap 20. At the same time, he presses on the unblocking member 126 to release the immobilizing member 124, which goes into its disengaged position. The user then pulls the strap 20 moving away from the rail 18, toward the inside of the trunk 16.

The strap 20 then unwinds outside the adjusting means 20C through free rotation of the winder 120 around the axis A-A' in the first direction, against the return member 122. The sliding elements 32 then spontaneously and freely slide in the slider in the direction of the ends 18A, 18B of the rail 18.

When the compartment 44 delimited by the strap 20 is large enough, the user releases the unblocking member 126. The immobilizing member 124 then returns to its engaged position under the effect of the extension of the spring 140. The strap 20 is then immobilized in that configuration.

The user then inserts one or more accessories in the compartment 44. Then he activates the unblocking member 126, which disengages the immobilizing member 124, the return member 122, then drives the winder in the second direction toward a retracted configuration of the strap. The length of the strap 20, as well as the positions of the sliding elements 32, then automatically adapts to the dimensions of the inserted accessory, by withdrawal of the strap 20 toward its retracted configuration under the effect of the stress created by the return member 122.

The user can then reiterate these operations for another compartment 44, so as to insert other accessories, generally with different dimensions.

If the user then wishes to make fine adjustments to the active length of the strap, the user maneuvers the additional adjusting member 130 to rotate the winder 120, the immobilizing member 124 remaining engaged on the winder 120.

The accessories are then securely supported in the different compartments 44, even in case of sudden acceleration or deceleration or impact of the vehicle, the strap 20 being firmly blocked by the immobilizing member 124 of the adjusting means 20C in its configuration keeping the accessories against the wall 14.

Figure 10:
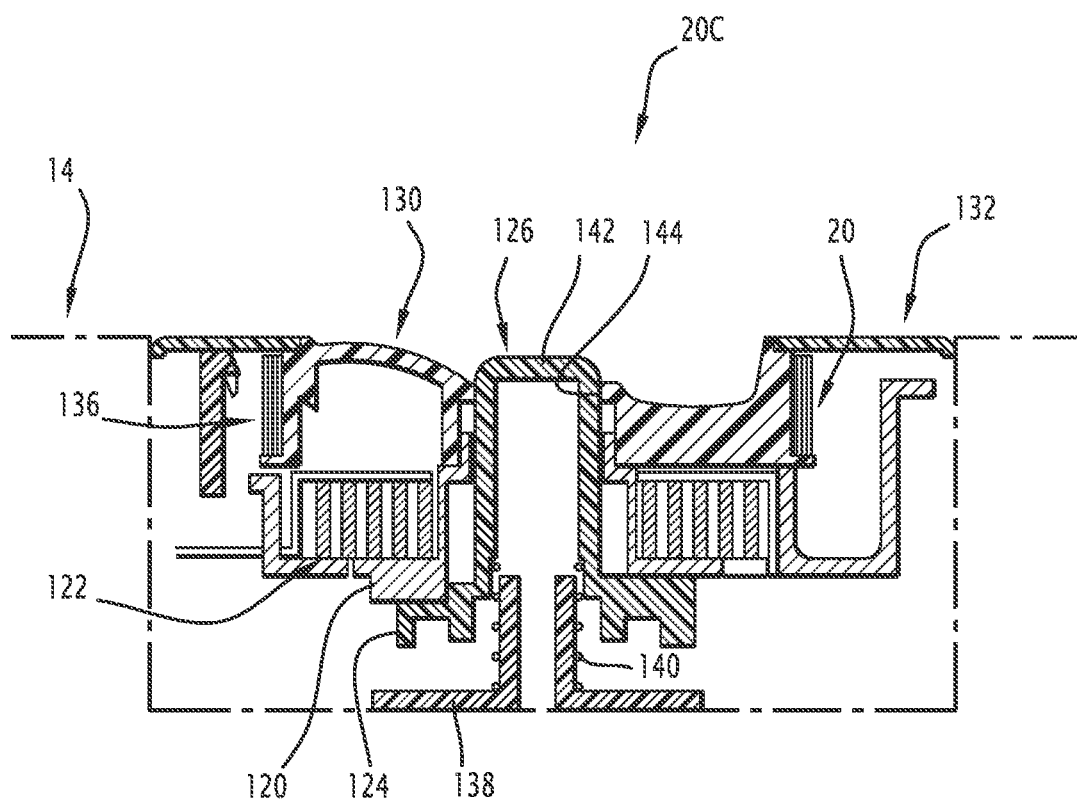
FIG. 10 is a diagrammatic cross-sectional view of another preferred embodiment of means for adjusting the active length of the strap of the device of FIG. 1.

FIG. 10 illustrates an alternative embodiment of the adjusting means 20C. In this alternative, the additional adjusting means 130 are formed in the winder 120. To that end, the strap 20 is wound around the hand wheel.

The winder 120, the unblocking member 126 and the hand wheel are then completely received in the housing 132 without protruding outside the latter. The housing 132 is mounted in the inner wall 14 or on the rail 18, such that the adjusting means 20C do not protrude in the trunk.

It will be noted that the invention is not limited to the embodiments previously described, but may on the contrary assume various alternatives without going beyond the scope of the claims.

Thus, in one alternative, the adjusting means 20C are provided with no immobilizing member 124 and unblocking member 126. The strap 20 is then continuously stressed toward its wound configuration. The adjusting means 20C can then include immobilizing means that are deactivated when idle and which can be activated when a given force is applied on the strap 20, for example during a significant acceleration or deceleration of the vehicle or in case of impact.

In another alternative, the adjusting means 20C are provided without a winder 120. The strap 20 is partially received in the longitudinal housing delimited in the wall 14, and has an active length protruding outside the housing. The return member 122 can then be formed by an elastic connector, such as a spacer.

What is claimed is:

1. An inside motor vehicle element comprising:
   an inner wall; and
   a device for keeping at least one accessory against the inner wall comprising:
      a rail securable to the inner wall, the rail including a bearing element;
      a strap having a fixed length, the strap designed to keep the at least one accessory against the bearing element;
      at least one sliding element slidable along a length of the rail, the strap being able to be connected to the at least one sliding element;
      an adjustment device adjusting the strap to an active length of the strap, the adjustment device including:
         a return element adjusting the active length of the strap to a minimum length which defines a retracted configuration;
         a winder rotatable around a rotation axis, the strap winding around the winder when the active length is less than the fixed length;
         an immobilizing member, the immobilizing member being actuatable between an engaged position and a disengaged position, in the engaged position the immobilizing member prevents the winder from rotating around the axis under an effect of the return element, in the disengaged position the winder is able to freely rotate around the axis, the immobilizing member being translatable along the rotation axis between the engaged position and the disengaged position;
         an unblocking member for releasing the immobilizing member; and
         an adjuster further adjusting the active length of the strap, the adjuster being actuatable to drive the winder around the rotation axis when the immobilizing member is in the engaged position.

2. The inside motor vehicle element according to claim 1, wherein the inner wall is a part of a lateral trunk trim, a floor, a threshold trim, a door panel, lateral walls of a front console or a seat element.

3. A device for keeping at least one accessory against an inner wall of a motor vehicle comprising:
   a rail securable to the inner wall, the rail including a bearing element;
   a strap having a fixed length, the strap designed to keep the at least one accessory against the bearing element;
   at least one sliding element slidable along a length of the rail, the strap being able to be connected to the at least one sliding element;
   an adjustment device adjusting the strap to an active length of the strap, the adjustment device including:
      a return element adjusting the active length of the strap to a minimum length which defines a retracted configuration;
      a winder rotatable around a rotation axis, the strap winding around the winder when the active length is less than the fixed length;
      an immobilizing member, the immobilizing member being actuatable between an engaged position and a disengaged position, in the engaged position, the immobilizing member prevents the winder from rotating around the axis under an effect of the return element, in the disengaged position, the winder is able to freely rotate around the axis, the immobilizing member being translatable along the rotation axis between the engaged position and disengaged position;
      an unblocking member for releasing the immobilizing member; and
      an adjuster further adjusting the active length of the strap, the adjuster being able actuatable to drive the winder around the rotation axis when the immobilizing member is in the engaged position.

4. The device according to claim 3, wherein the strap is made of a non-extensible material.

5. The device according to claim 3, wherein the sliding element comprises a passage into which the strap is to be inserted, and wherein the strap is slidably mounted in said passage.

6. The device according to claim 3, wherein a first end of the strap is fastened on the adjustment device, a second end of the strap is fixed relative to the inner wall, the sliding element being arranged between the ends of the strap.

7. The device according to claim 6, wherein when the second end of the strap is fixed relative to the inner wall, each sliding element is maintained in the rail.

8. The device according to claim 6, further comprising a tip for fastening the second end of the strap on the rail, the tip cooperating with a complementary shape formed in the rail.

9. The device according to claim 8, wherein the tip is at one end of the rail.

10. The device according to claim 3, wherein the sliding element includes a gripping device for controlling the sliding of the sliding element in the rail.

11. The device according to claim 3, wherein the sliding element includes a base body and a guide, the guide separating the strap from the rail to allow a user to grasp the strap when the sliding element is received at the rail, the guide including at least one front stop and one rear stop protruding relative to the base body and at an end of the base body in a longitudinal direction, each stop having a sliding surface for the strap, which diverges away from the base body and away from the rail.

12. The device according to claim 3 wherein the unblocking member is translatable along the rotation axis.

13. The device according to claim 3 wherein the unblocking member is a button and connected to the immobilizing member.

14. The device according to claim 3 further comprising a housing securable to the inner wall or rail.

15. The device according to claim 14 wherein the housing contains the adjustment device.

16. The device according to claim 15 wherein the unblocking member is accessible from outside the housing.

* * * * *